(12) United States Patent
Pepper et al.

(10) Patent No.: US 7,729,572 B1
(45) Date of Patent: Jun. 1, 2010

(54) OPTICAL TAPPED TIME DELAY MODULES AND ARRAYS

(75) Inventors: David M. Pepper, Malibu, CA (US); David Sumida, Los Angeles, CA (US); Richard P. Berg, Driggs, ID (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 12/169,174

(22) Filed: Jul. 8, 2008

(51) Int. Cl.
- *G02B 6/42* (2006.01)
- *G02B 6/26* (2006.01)
- *H01Q 3/22* (2006.01)
- *H04J 14/00* (2006.01)
- *H04J 14/08* (2006.01)

(52) U.S. Cl. ............ 385/27; 398/53; 398/102; 385/24; 385/48; 342/375

(58) Field of Classification Search ........... 385/15, 385/24, 27, 39, 40, 48; 398/52, 53, 102; 342/368, 375

See application file for complete search history.

(56) References Cited

U.S. PATENT DOCUMENTS

| | | | |
|---|---|---|---|
| 4,088,969 A * | 5/1978 | Crowley et al. ......... 333/153 |
| 4,736,463 A | 4/1988 | Chavez |
| 4,813,766 A | 3/1989 | Keene et al. |
| 4,939,527 A | 7/1990 | Lamberty et al. |
| 5,051,754 A | 9/1991 | Newberg |
| 5,061,048 A | 10/1991 | Hayden et al. |
| 5,103,495 A | 4/1992 | Goutzoulis |
| 5,117,239 A | 5/1992 | Riza |
| 5,202,776 A | 4/1993 | Gesell et al. |
| 5,272,484 A | 12/1993 | Labaar |
| 5,455,878 A | 10/1995 | Thaniyavarn |
| 5,461,687 A | 10/1995 | Brock |
| 5,512,907 A | 4/1996 | Riza |
| 5,526,170 A | 6/1996 | Esman et al. |
| 5,543,805 A | 8/1996 | Thaniyavarn |
| 5,583,516 A | 12/1996 | Lembo |
| 5,623,360 A | 4/1997 | Gesell et al. |
| 5,641,954 A | 6/1997 | Keefer et al. |
| 5,694,134 A | 12/1997 | Barnes |
| 6,128,421 A | 10/2000 | Roberts |
| 6,144,786 A | 11/2000 | Chethik |

(Continued)

FOREIGN PATENT DOCUMENTS

WO    00/43828    7/2000

OTHER PUBLICATIONS

Nguyen et al., "Pencil-beam full-space scanning 2D CRLH leaky-wave antenna array," International Symposium on Signals, Systems, and Electronics, pp. 139-142, Jul. 30, 2007.

(Continued)

*Primary Examiner*—Daniel Petkovsek
(74) *Attorney, Agent, or Firm*—Ladas & Parry

(57) ABSTRACT

An optical time delay module has a plurality of time delay elements connected in a series and a plurality an optical output couplers wherein each of said optical output couplers is operationally connected between one or more time delay elements in said series, the optical output couplers providing a plurality of optical outputs from said module with different optical delays controlled by an analog voltage.

14 Claims, 10 Drawing Sheets

Top View

U.S. PATENT DOCUMENTS

| | | | |
|---|---|---|---|
| 6,157,475 | A | 12/2000 | Dugan et al. |
| 6,310,831 | B1 | 10/2001 | Dillman |
| 6,351,587 | B1 | 2/2002 | Holland |
| 6,356,677 | B1 | 3/2002 | Hall et al. |
| 6,393,177 | B2 | 5/2002 | Paek |
| 6,674,930 | B2 | 1/2004 | Hall et al. |
| 6,760,512 | B2 * | 7/2004 | Pepper .................. 385/27 |
| 6,891,987 | B2 * | 5/2005 | Ionov et al. ............. 385/15 |
| 7,283,708 | B2 * | 10/2007 | Efimov .................. 385/39 |
| 2002/0054726 | A1 | 5/2002 | Fondeur et al. |
| 2002/0181874 | A1 | 12/2002 | Tulchinsky et al. |
| 2003/0002773 | A1 | 1/2003 | Parker et al. |

OTHER PUBLICATIONS

Chen et al., "Photonic true time delay module for high frequency broad band phase array antenna," Proceedings of SPIE, vol. 4292, May 30, 2001.

Benjamin, R., et al., "Optical beam forming techniques for phased array antennas," IEEE Proceedings-H vol. 139, No. 6 Dec. 1992, pp. 526-534.

Fu, Z., et al., "Five-bit substrate guided wave true-time delay module working up to 2.4 Thz with a packing density of 2.5 lines/$cm^2$ for phased array antenna applications," *Optical Engineering*, vol. 37, No. 6, pp. 1838-1844 (1998).

Tang, S., "Polymer-Based Optical Waveguide Circuits for Photonic Pahased Array Antennas," SPIE Conference on Optoelectronic Interconnects VI, SPIE vol. 3632, Jan. 1999.

Yamaguchi, M., et al., "Variable optical delay line based on a birefringent planar optical platform," Optical Society of America (1995).

Yin. S., "Lithium Niobate fibers and Waveguides: Fabrications and Applications," Proceedings of the IEEE. vol. 87, No. 11 (Nov. 1999).

* cited by examiner

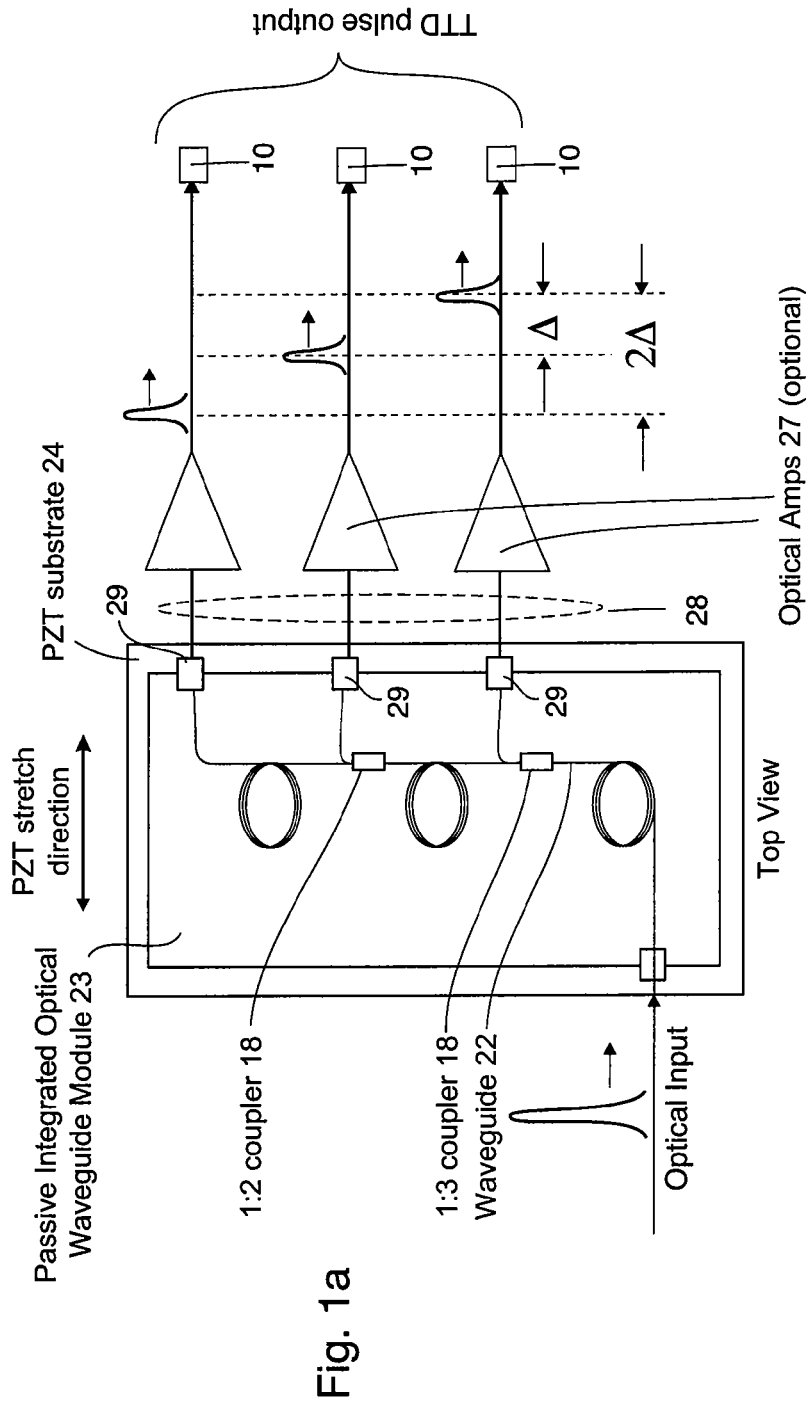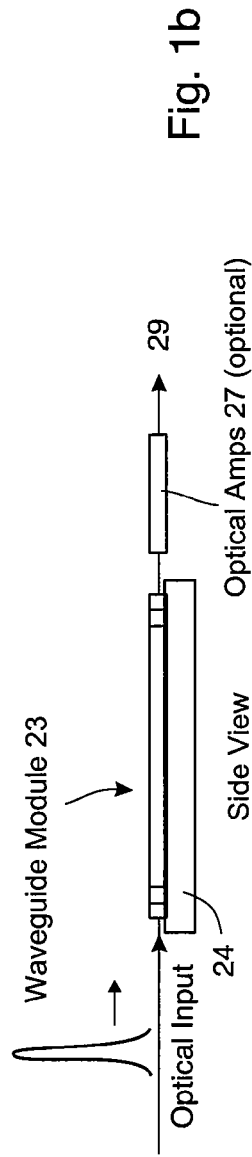

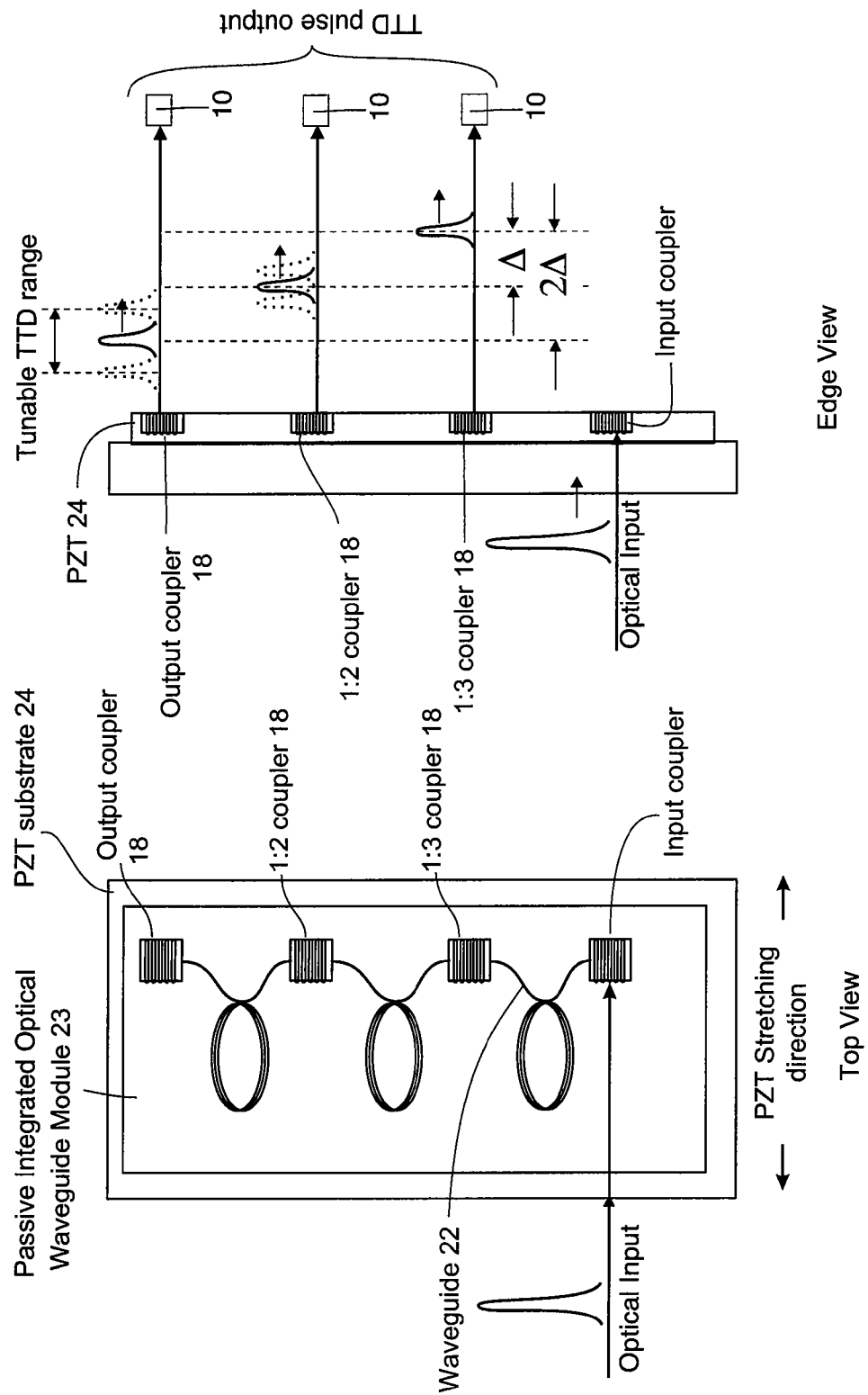

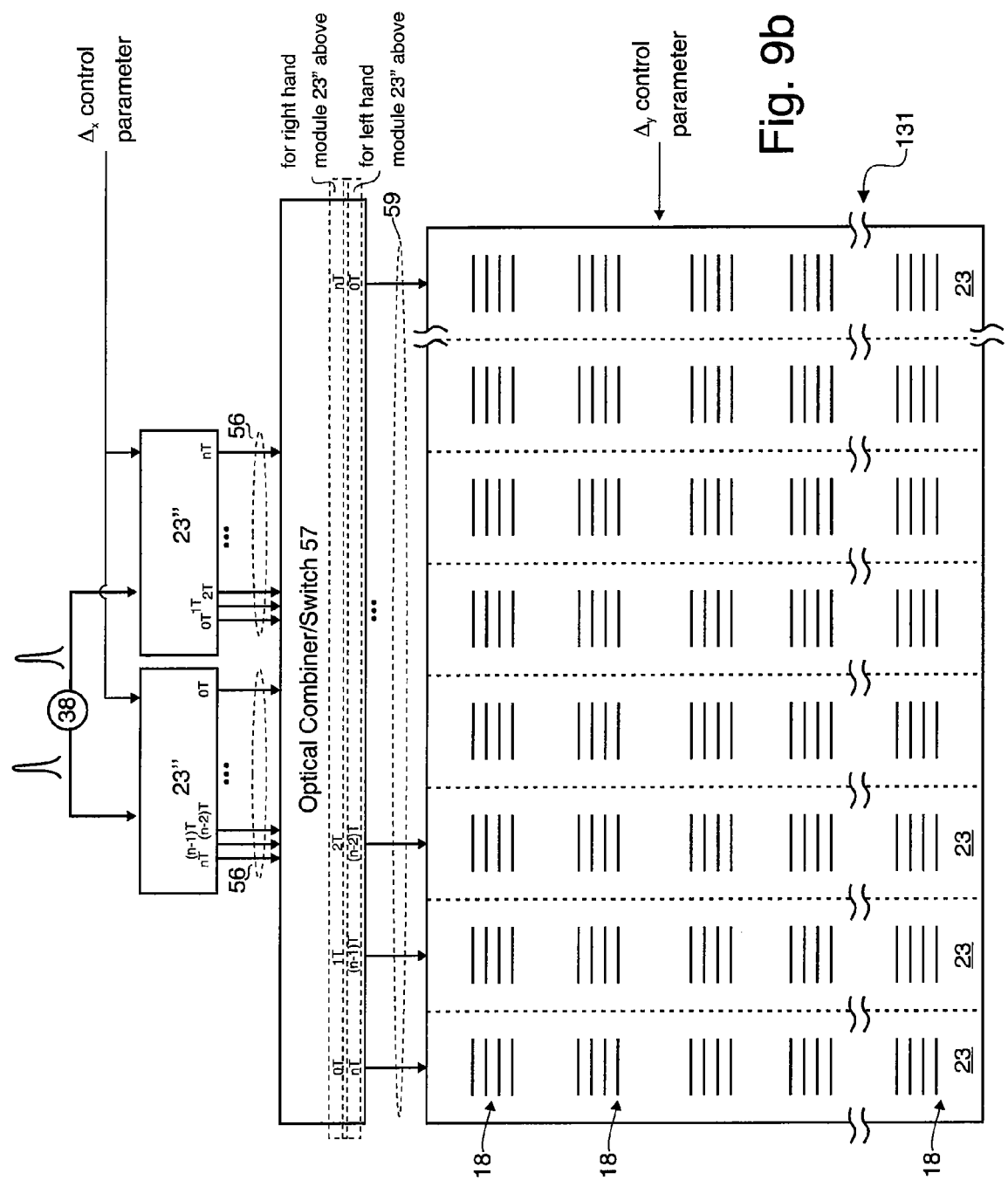

OPTICAL TAPPED TIME DELAY MODULES AND ARRAYS

CROSS REFERENCE TO RELATED PATENT AND PATENT APPLICATIONS

This application is related to the disclosure of U.S. Pat. No. 6,760,512 by David M. Pepper, the disclosure of which is hereby incorporated herein by reference.

This application is also related to U.S. patent application Ser. No. 12/025,647 filed Feb. 4, 2008, entitled "Two-dimensional Optical True Time Delay Method" and to U.S. patent application Ser. No. 12/025,643 also filed Feb. 4, 2008, entitled "Digitally Controlled Optical Tapped Time Delay Modules and Arrays", the disclosures of which are hereby incorporated herein by reference.

TECHNICAL FIELD

Optical beam control is often required where information from an optical beam must be relayed from one location to another. High-bandwidth, secure laser communication (e.g. pulse-burst encoding, pulse position modulation, etc.), infrared countermeasures (IRCM), target designation, bio/chem beam steering and laser radar are a few of the applications in which optical beam control is required. Optical beam control of pulsed optical beams requires that the control device provide time-coincident generation of the desired pulse format across the entire aperture of the control device.

Devices for steering optical beams are well known in the art. Optical beam steering can be implemented with electromechanical systems. Such systems generally consist of a mirror mounted on an electrical actuator. These systems provide relatively low losses for the strength of the reflected beam. However, such electro-mechanical systems are limited to low response frequencies up to the order of 1 KHz. The moving parts of an electro-mechanical system along with size and weight factors are considered to be major limitations of such a system.

Smaller and lighter optical beam steerers are provided by compact arrays of non-mechanical beam deflectors, such as optical MEMS mirrors (O-MEMS) or liquid crystal arrays. The optical signal provided to these devices is generally split into multiple optical signals. The arrays then actually consist of multiple optical radiators which act to steer and radiate multiple optical signals in a desired direction. However, since the radiators are generally deployed in a relatively flat plane, the output beams do not arrive at a receive point at the same time. This problem is particularly seen when the optical signal comprises pulsed signals. In this case, the optical pulse received from the radiating element furthest from the receive point will lag the pulse received from the closest radiating element. This problem is further exacerbated when the pulse widths (or the time slots for encoding) are shorter than the photon transit time across the radiating aperture. Performance of the optical transmitting system is improved when the individual optical beams are made time-coincident to create a time-coincident optical beam.

Applying a time delay to each optical beam before it is radiated provides the capability to generate a time-coincident optical beam. Controlling the delay of signals from individual transmitting elements is actually the principle behind a beam-steered phased array antenna system. Phased array antenna systems employ a plurality of individual antenna elements that are separately excited to cumulatively produce a transmitted electromagnetic wave that is highly directional. In a phased array, the relative phases of the signals provided to the individual elements of the array are controlled to produce an equiphase beam front in the desired pointing direction of the antenna beam. The premise of a true-time delay beam-steered phased array is to steer the array beam by introducing known time delays into the signals transmitted by the individual antenna elements. Accurate beam steering of a pulsed optical beam from individual optical elements similarly requires introducing time delays into the optical signals from individual optical elements to produce an equiphase optical beam front.

Optical control systems for producing selected time delays in signals for phased array antennas are well known in the art. Different types of optical architectures have been proposed to process optical signals to generate selected delays, such as routing the optical signals through optical fiber segments of different lengths; using deformable mirrors to physically change the distance light travels along a reflected path before transmission; and utilizing free space propagation based delay lines, which architecture typically incorporates polarizing beam splitters and prisms. These techniques can also be used for optical beam steering, with various levels of success.

The use of optical fiber segments to introduce delays requires the use of many optical switches and the splicing together of numerous segments of fiber. The costs of construction of such a device are substantial, given the significant amount of design work and precision assembly work required to produce a device having the range and incremental steps of time delays necessary to provide the desired steering. The numerous switching and coupling elements also introduce very high optical losses in the beam-forming circuitry, requiring significant optical power.

The deformable mirror system relies on the physical displacement of a mirror to provide the necessary time delay; an array of moveable mirrors allows the generation of a range of delayed optical signals. This type of system introduces additional complexity into an optical beam steering system due to the tight tolerances and small time delays required for optical signals.

An optical architecture for time delay beam-forming using free space elements is disclosed by Riza in U.S. Pat. No. 5,117,239, "Reversible Time Delay Beamforming Optical Architecture for Phased-Array Antenna," dated May 26, 1992. In Riza, input optical beams are directed through a plurality of free space delay devices which selectively delay the beams. The delay imparted to an individual beam is selected by a plurality of spatial light modulators coupled with polarizing beam splitters which will either pass a light beam or direct the light beam into a delay device. This architecture also requires a large number of individual delay devices, which increases the complexity and cost of the system.

An optical true-time delay bulk structure is disclosed by Zhenhai Fu and Ray T. Chen in "Five-bit substrate guided wave true-time delay module working up to 2.4 THz with a packing density of 2.5 lines/cm$^2$ for phased array antenna applications," Optical Engineering, Vol. 37, No. 6, June 1998, pp. 1838-1844. The bulk substrate disclosed by Fu and Chen comprises a passive waveguide that takes as an input an optical pulse and generates a sequence of output pulses with fixed delays. In this prior art, the passive substrate is used to provide delays to an optical signal and a photonic switching network is used to select a given set of taps. Holographic gratings are used to provide the output taps along the delay line. To assure that each tap has the same optical output power, the diffraction efficiency of the gratings is designed to increase along the delay line, as the successive taps couple the light out. Since the waveguide is passive, i.e., no external control is used to modify the delay provided by the waveguide, and, further, the tapped output locations are fixed, the output sequence of optical pulses is fixed in a temporal sense and cannot be changed. The device disclosed by Fu and Chen is directed to optically controlling an RF pulse-forming network with a fixed set of time delays.

Based on the foregoing it was believed to be desirable to provide a mechanism for producing variable true time delay in an optical signal without requiring active switching and without high insertion loss. A one dimensional solution is presented in U.S. Pat. No. 6,760,512 by David M. Pepper, noted above, which is a mechanism that would allow for precision optical beam steering.

The aforementioned and related U.S. patent application Ser. No. 12/025,647, filed Feb. 4, 2008, entitled "Two-dimensional Optical True Time Delay Method" relates to the use of a multiplicity of tapped optical delay lines as a means to generate a programmable optical true-time delay (TTD) network over a two dimensional (2-D) array for a planar beam-steering aperture using only two independent control signals. The set of tapped outputs provides a corresponding set of subapertures through which each output optical pulse emerges, with increasing delayed outputs along each tapped line (assuming an input optical pulse at one end of the line) for a two-dimensional N×M array addressed by two (2) independent TTD controls signals. The term 'subaperture' refers to individual pixelated apertures within an overall aperture. Depending on the specific aperture hardware embodiment, the subapertures may be actually pixelated (i.e. discrete individual 'mini' apertures) or they may be only connected on a subaperture basis but really are part of one contiguous large monolithic aperture).

The technology disclosed therein provides a means of simple control of a large arbitrary number subapertures configured as a of 2-D set tapped arrays, so that only two independent control parameters are required to result in a set of linear, programmable time delays for all subapertures in the 2-D array. This dramatically reduces the required number of control parameters from N×M controls to only two control parameters.

This application describes a number of specific embodiments for tapped delay lines which may be used in the application described in the aforementioned US Patent Application, but they may be used in other applications as well. The described tapped delay lines are programmable and can be reconfigured rapidly (≈1 msec or less), which is suitable for most laser communication scenarios.

The described delay lines may be used to provide a set of optical delays that drive a planar array (1-D or 2-D) of beam-steering elements. The composite system may be used, for example, for beam steering of high-bandwidth information in an optical communication system, which replaces traditional large mechanically driven gimbal mirrors with compact, planar arrays of optical MEMS, liquid crystal, or other planar non-gimbal beam-steerers. The TTD network is required to assure simultaneous arrival of a set of short optical pulse outputs from an array of sub-apertures to a given target, across a large field of view (≈45°).

This invention is useful in a variety of free-space laser communication systems, flash ladar, range finding, pulsed laser metrology, remote sensing and other high-bandwidth optical systems.

This invention improves on the prior art in programmable optical delay line technology.

Maintaining spatial wavefront coherence across the entire aperture of an optical transmitter is also described herein. Spatial coherence provides for diffraction limited performance across the entire aperture. This enhances the optical intensity that can be received at the receiver end of a communications link.

BRIEF DESCRIPTION OF THE FIGURES

FIGS. 1a and 1b depict an analog embodiment of a tapped time delay module which may be used to embody a 1-D or 2-D beam steerer controlled by one or two control parameters; in this embodiment three channels are shown, with FIG. 1a showing a top view and FIG. 1b showing a side view. In this embodiment the programmable time-delayed output beams emerge in a plane parallel the major surface of the device.

FIGS. 2a and 2b depict another analog embodiment of a tapped time delay module which may be used to embody a 1-D or 2-D beam steerer controlled by one or two control parameters; in this embodiment three channels are shown, with FIG. 2a showing a top view and FIG. 2b showing a side view. In this embodiment the programmable time-delayed output beams typically emerge perpendicular (normal) to the major surface, but they can emerge at different angles, as determined by the grating output couplers, if desired.

FIGS. 8a and 8c) therefore enable the variation of time delays that can span 360° in the plane of the figure about an axis normal to the page.

FIGS. 9a and 9b depicts utilizing two modules with fixed delays of the type shown in FIG. 7 to control one dimension of a 2-D beam steering array and using a module of the type shown for example in FIGS. 2a and 2b, for example, to control the other dimension.

INTRODUCTION TO THE DETAILED DESCRIPTION OF PREFERRED EMBODIMENTS

Figures 3A, 3B:
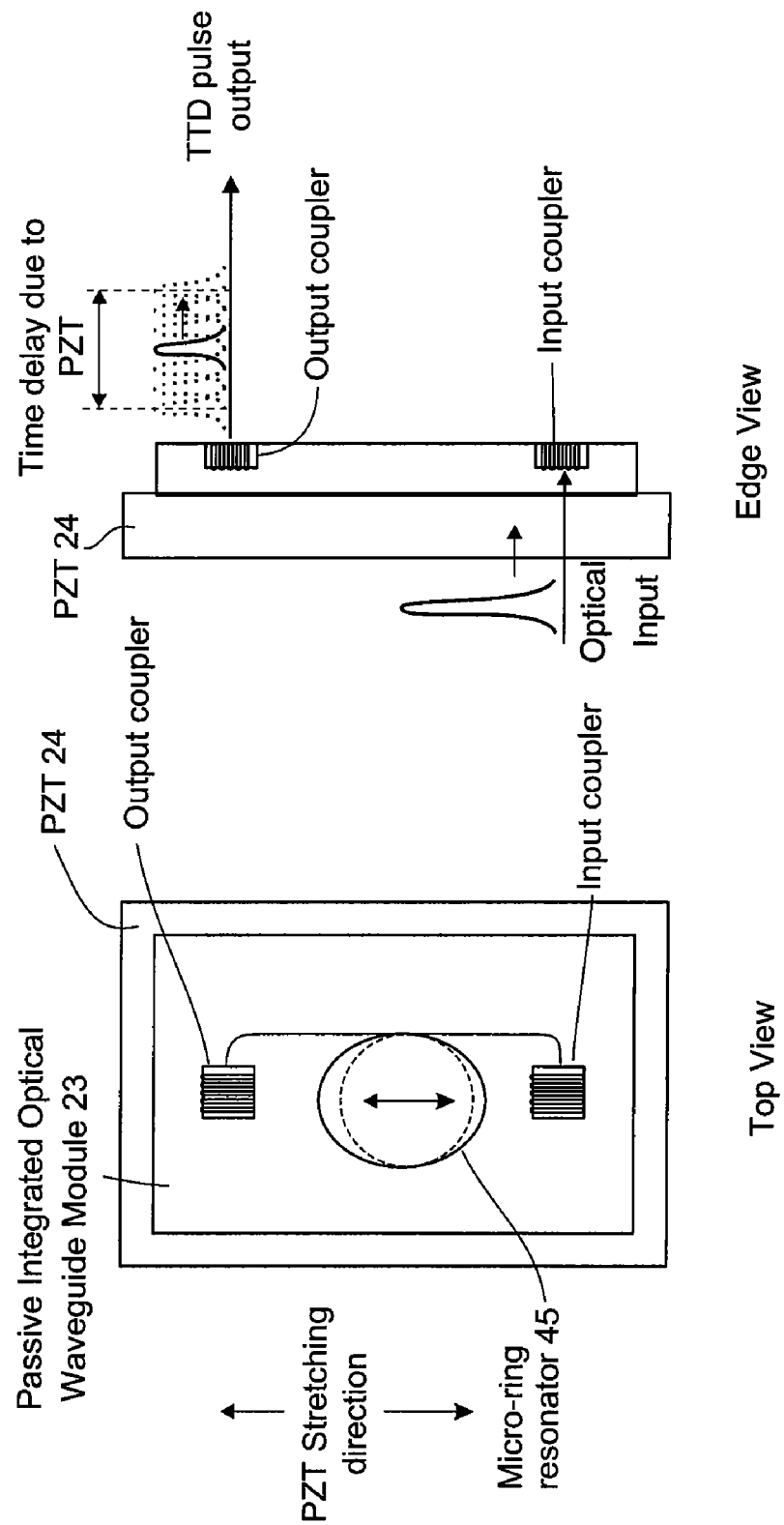
FIGS. 3a and 3b depict an analog embodiment of a tunable micro-resonator device. In this embodiment a single channel is shown, with FIG. 3a showing a top view and FIG. 3b showing a side view. This structure can also be used as a tunable optical filter as well as a means to realize a so-called "slow-light" device.

Three embodiments are discussed below. In each embodiment, two control parameters can control the time delay associated with a 2-D array of linear tapped time delay units as described in our aforementioned and related U.S. patent application Ser. No. 12/025,647 filed Feb. 4, 2008, entitled "Two-dimensional Optical True Time Delay Method" for a discussion of how to determine the value of the two control parameters $\Delta_y$ and $\Delta_x$ used to control a 2-D array of optical apertures.

A digital embodiment of an optical time delay module which may be used for 2-D beam steering in the manner described in our related US patent application identified above is described in the other related US patent application mentioned above. In the digital embodiment, which we refer to as "a digitized true-time delay module," a single binary word (1s and 0s) controls an ensemble of identical digitized true-time delays modules. Since only two control parameters are required for two-dimensional beam steering (as previously described above), only two binary words are required. In this case, the amount of time delay (in each dimension) is digitized, since a binary bit stream is used as the control setting.

We disclose herein an "analog true-delay module," wherein a single (analog) applied voltage level controls an ensemble of identical analog true-time delay modules. Since only two control parameters are required for two-dimensional beam steering, only two analog voltages are required. In this case, the amount of time delay (in each dimension) is continuous, since an analog voltage level is used as the control setting.

In both the digital and analog embodiments, the module can be a photonic chip or photonic crystal, with optical waveguides, diffraction gratings, optical switching networks, and waveguide couplers all being preferably integrated into a single photonic chip or, alternatively, an ensemble of identical photonic chips.

Finally, optical gain can be integrated into the chips via optical pumping of gain regions in either the guiding structure or in the substrate. Waveguide and coupler optical losses can be compensated for, if need be, as well as enhancing the Q of a micro-resonator.

While these embodiments may be particularly useful in connection with the method described in our related US patent application, these embodiments will doubtlessly find use in other applications and indeed we describe still further embodiments which are useful in applications other than the two-dimensional optical beam steering of our related US patent application identified above.

There are myriad applications for this technology. We describe the use of this technology as a means to provide a set of tapped optical delay lines, with application to high-bandwidth optical beam steering for laser communication systems over a free-space propagation path using a true-time delay (TTD) approach with programmability in the US patent application identified above. This is followed by a brief discussion of other potential device and system embodiments using variations on our basic analog embodiments.

Analog True-Time Delay Modules for Beam Steering

One aspect of the analog optical tapped time delay module 23 of FIGS. 1a and 1b involves a single, long, passive optical waveguide 22—disposed on a major surface of a preferably planar structure 23—with a set of optical output couplers 18 along its length, each of which is coupled to pass light via an output 29. A long optical guide 22 is preferably chosen to have minimal waveguide and material dispersion, so that it does not degrade the bandwidth of the network in which the module 23 is used (this is true for all classes of high-bandwidth photonic devices; in this embodiment, this important requirement is the only limiting factor, whereas, in the prior art, many other, more demanding factors determine the ultimate performance, such as length control during processing, minimum digitized delay line, etc.). Photonic-crystal based integrated optical structures can also be employed for enhanced bandwidth of the embodiments described herein. The output couplers 18 can be in the form of a set of 1×2 optical output couplers 18 in the case of a long fiber or a set of grating couplers, fabricated into a planar waveguide structure. The optical taps provided by the couplers 18 can be of equal ratio (e.g., 50/50) but more typically the taps are arranged in a geometrical sequence of ratios, with ratios chosen to provide for equal light output amplitudes along the array (splitter ratio=1/(N−n+1) for N taps, with n increasing by one for each subsequent tap, so n=0, 1, 2, 3, . . . , N). The taps provided by couplers 18 are typically spaced at equal intervals along the length of the single optical waveguide (this assumes that these delay lines are used in connection with a set of beam steering elements having a fixed pitch or equal spacing between them). The fractional output for each tap can be realized either by the coupling coefficient for a waveguide coupler or modifying the diffractive grating parameters (e.g., grating length, etc.—see FIG. 2) at each tap location to achieve the desired value of out-coupling at a given tap location.

The integrated optical waveguide module 23 is attached (e.g., bonded, flip-chip processed, etc.) to a PZT element 24, forming a chip-scale structure. This module 23 and the waveguide channel 22 may be fabricated using thin-film deposition techniques to deposit a thin film transparent material. For example, a Hydex-based compact optical waveguide structure or photonic crystal structure for defining the waveguide module 23 may be grown onto a PZT (or other smart piezoelectric or piezoelectric-like material) substrate 24. Typically the physical length of the compact delay line 22 is chosen so that for typical PZT-induced stretching ($10^{-4}$), the total delay for each tap length is consistent with the optical transit time from one beam-steering sub-aperture 10 to its nearest neighbor. As an example, for a 100 μm pitch of a multi-subaperture beam steering element, the required path length will be $\approx 10^{-4} \times 100$ μm/n, where n is the effective index of the guide (n≈1.5), or about 60 cm of waveguide. Note that PCFs (or, photonic crystal planar waveguides), may be suitable here, where the effective index may be much greater near a photonic band edge (with system bandwidth as a tradeoff, owing to the dispersion), thereby reducing the physical length of the waveguide channel. Optical gain can be incorporated into the structure (e.g. substrate and/or guided medium) to compensate for propagation losses through such relatively long time delay lines.

Depending on the required system parameters (the reconfiguration response time, the maximum drive voltage slew rate, the pitch, the system bandwidth, etc.), a single PZT chip may suffice, or, a cascaded network of identical PZTs may be required, with one or more taps per PZT chip. In any case, only a single control voltage is required for a linear array of tapped TTDs. If used in the y-array of a two dimensional array as taught in the related application identified above, a single control voltage $\Delta_y$ is used to control the y-array and if used in the x-array a single control voltage $\Delta_x$ is used to control the x-array. In either case the control voltage $\Delta_y$ or $\Delta_x$ controls the amount of stretch of the PZT substrate 24, and hence the material in module 23. Conceptually, the analog control module 23 of FIGS. 1a and 1b may be substituted for the digital control modules 23 (both upstream and downstream) of FIGS. 1a and 1b in the related patent applications identified above, with an analog voltage as opposed to a digital word providing the control parameters $\Delta_y$ and $\Delta_x$. The PZT material is arranged so that the stretch direction is preferably parallel to the major surface and perpendicular to the overall direction of the basic waveguide structure 23 to minimize PZT-induced elongation along the basic waveguide 22.

A structure fabricated with a large-index guide can be employed to realize a very compact set of delay lines—each tap in the form of spiral or zig-zag guides—each with a planar tap feeding a 1×2 Bragg coupler 18. The Bragg coupler 18 is designed such that one output port of the coupler continues to the next delay channel of the structure. The other output port is the delayed "tap" output that goes to its respective beam steering sub-aperture. There are two possible designs for this output tap. In one design, each output "tap" remains in the plane of the structure, but near the edge of the chip, and is subsequently coupled into a fiber to drive the beam-steering sub-aperture. In another design, the output tap diffracts off the grating and emerges into free space in a direction normal to the plane of the chip (e.g., this can be realized using a "2-k" Bragg grating). In this case, the set of TTD output "ports" emerge normal to the chip and propagate into free space in parallel. This set of parallel, yet delayed, outputs are then directed to the respective set of beam-steering sub-apertures (alternatively, the set of output beams can strike a computer-generated holographic element that diffracts the composite set of TTDs to the respective beam-steering elements).

Now, the entire chip is bonded to a PZT substrate 24 (or, equivalently, the chip can be grown onto the PZT substrate 24, or the PZT/smart-material can be thin-film-deposited onto the waveguide structure, etc.) as shown in FIG. 1b. Even though the physical length of the delay network is roughly the same as in the digital fiber embodiment of the related U.S. patent application Ser. No. 12/025,643 (60 cm per tap, in the digital embodiment discussed therein), the overall physical size of the structure may be very small. This follows since the core/cladding refractive index difference is relatively large (e.g., using the "Hydex" material of the former Little Optics) compared to conventional fibers (10% vs. 0.1%). Therefore, the guided mode is more tightly confined, requiring much less material (mass) to fabricate the effective core and cladding for low-loss guiding—both in the plane of the chip as well as normal to the chip. For example, a 1-meter long delay line can be fabricated into a 2-mm diameter spiral. In fact, one can polish the substrate to realize a very thin optical chip, which is then bonded onto the PZT, or, in another case, one can evaporate the Hydex onto or PZT or vice versa—all with the goal of minimizing the mass of the TTD chip without inducing optical loss. In any case, this implies that the mass of the structure will be much less than the mass of an equivalent length of optical fiber. Therefore, a much smaller PZT element will be required to provide the same differential set of TTDs.

Using this design philosophy, one can fabricate a set of TTD spirals of even longer length (say, 6 meters instead of 60 cm). In this case, one only requires $10^{-5}$ PZT-induced length, instead of $10^{-4}$, to produce the same 100 µm of effective time delays. This flexibility can enable a lower PZT drive voltage and, concomitantly, a lower slew rate, as well as a more rapid TTD reconfiguration time.

A system tradeoff here is the optical loss in the waveguide 22 (≈1 dB/cm). (Of course, other materials have far less loss; hence, longer lengths can be realized, as well as much higher Qs, leading to greater spectral channel capacity as well as enhanced narrowband filters.) To compensate for this loss, one can provide an optical amplifier 27 downstream of the TTD array, as shown in FIG. 1a. Another possibility is to incorporate gain into the chip 23 itself. This can be accomplished by evaporating the Hydex onto a doped substrate in one embodiment, or, in another embodiment, by doping the Hydex itself. The doping profile can either be spatially uniform or can be formed with a mask that is aligned with the guide, thereby optimizing the system and minimizing laser-induced heating of the structure. In another embodiment, the optical pumping source can be directed to only the spiral regions of the system, using an array of lenslets or diffractive optical elements between the laser and the chip, in order to optimize the optical efficiency of the system.

Also note that if the PZT-induced stretching is not uniform across the structure, such systematic effects can be engineered into the device by designing the optical waveguide delay lengths to offset for such differentials. Since this can be done at the mask stage, all fabricated devices will have the same "built-in" compensation. Such design issues will maintain the bandwidth of the overall TTD network (via output pulse simultaneity at the receiver).

By extension, another embodiment of the TTD device is to provide the proper set of time delays in a two-dimensional array. It has been shown (by Pepper in U.S. Pat. No. 6,760, 512) that one can reduce the number of drive parameters in a linear TTD array from N to 1, by using a set of identical time-delay taps between each output tap of the line. In Pepper, it was shown that, for a two-dimensional TTD system, one can, by extension reduce the required number of total control parameters from N×M to 1×M. In the related application identified above, we demonstrate that one can reduce the total number of control parameters from N×M to only two (2) control parameters (corresponding, for example, to the two digital words for the embodiment of FIGS. 1a and 1b) for a 2-dimensional array. As an example, for a 100×100 array, the set of controls is reduced from 10,000 to only two control parameters.

Using this paradigm, any tapped delay array (even beyond the specific embodiments described herein), where the temporal spacing between taps is preferably the same in each dimension in general, or more specifically, the same in both dimensions, can now be configured with only two (2) control parameters using the optical delay structures disclosed herein, whereby output pulse simultaneity at a given target in free space can be assured in both azimuth and elevation ("az-el") across the entire field of view with only two control parameters. By extension, the chip-scale devices disclosed herein can be arranged in a two-dimensional structural configuration. This can be accomplished by using a PZT or smart material structure that is anisotropic so that a pair of control voltages can be applied for asymmetric mechanical elongation/compression along the principal axes of the element.

Yet another embodiment is to form a structure that can enable coupling normal to the plane of the structure. See FIGS. 2a and 2b. In this embodiment, each tapped output coupler 18 comprises a "2-k" Bragg grating, with the same sequence of progressively larger coupling ratios (to ensure identical output levels at each tap location). Thus, each tapped output will emerge normal to the surface for applications that involve coupling to fiber arrays or for free-space coupling with reduced diffractive spreading (owing to an effective larger output aperture). As in the prior embodiment, each delay structure can consist of a long, spiraled highly confined waveguide 22, a photonic crystal, etc. Also, amplification (in a saturated mode to equalize the output powers on the tapped module) can be added to either the Hydex layer itself or the substrate, as needed. The entire structure is bonded to a PZT 24 (or other smart material) substrate; equivalently, thin-film deposition techniques can be used during fabrication of the structure for large-volume manufacturing needs.

Another class of applications involves the use of the disclosed structures as compact, low-voltage phase shifters. This basic device is very similar to the TTD-based device of the related application identified above. However, now, the effective time delay corresponds to a distance equivalent to a fraction of an optical wavelength (as opposed to, perhaps, millions of optical wavelengths in the TTD invention of the related U.S. patent application Ser. No. 12/025,647 identified above).

In this case, either a much shorter "delay line" is needed, or, equivalently, a much smaller voltage need be applied to a tightly wound long-length spiral structure. Applications of this device include continuously tunable optical phase-shifters for coherent communications (e.g., quadrature control of homodyne receivers), tunable filters and DWDM networks, compact optical modulators, adaptive optical wavefront-correction systems, etc. The main benefit of such applications is that a much lower voltage and slew-rate is required to yield a given optical phase shift relative to the prior art (e.g., PZT-driven mirrors, fiber-wound mandrels, etc.), as well as providing improved compactness and ruggedness. Finally, arrays of optical phase shifters can be easily realized (using a mask set of multiple phase shifters) for applications such as multi-pixel wavefront correctors and for coherent imaging arrays, and high-bandwidth pulse-forming networks.

The two time-delay modes (millions of optical wavelengths and fractions of an optical wavelength) can be combined so that a single device can assure both the temporal coincidence of a set of beam-steered beamlets to a given location, as well as giving rise to a wavefront coherent beam across the total aperture of the TTD module. The wavefront coherence results in a diffraction-limited increase in optical brightness at the target location by a factor of N×M.

Other embodiments of a tapped optical time delay module 23 include a high-Q resonant chip-scale structure, which is called a micro-ring resonator 45. The micro-ring resonator 45 is bonded to a PZT substrate 24, so that it can be employed as a tunable optical filter or tunable optical discriminator for FM demodulation applications; see FIGS. 3*a* and 3*b*. Another potential application is in the photonics communication arena, examples of which include programmable optical demultiplexers and optical channelizers (in the case of an array of tunable filters). The company that utilizes Hydex (formerly, Little Optics) has designed multi-pole filters by using several high-Q annular resonators in various geometries. The analog time delay modules described herein can be used to programmably "fine tune" such structures continuously by using a PZT-based substrate as shown in FIGS. 3*a* and 3*b*. In general, for these embodiments, the waveguide structure is configured as an optical resonator ("race track" structures and whispering-gallery concave geometries have been demonstrated) and attached/bonded to the PZT control element. For high-Q applications, optical gain can be added to the structure via doping of the waveguide, the effective cladding and/or the substrate material. Optical pumping (e.g., using laser diodes or micro-chip lasers) can be used to provide population inversion of the device. Optical gain can also be used in the TTD applications, to offset propagation-path loss along the waveguide (of course, in this case, a down-stream optical amplifier can also be employed).

Given sufficient gain, the device of FIGS. 3*a* and 3*b* can also function as a tunable optical oscillator—a tunable compact laser on a chip. That is, if the optical gain applied to the ring resonator 45 in FIGS. 3*a* and 3*b* is greater than, or equal to, the resonator optical round-trip loss (defined as the ring resonator bounded by the grating couplers), laser oscillation will occur. Hence an optical beam will emerge from the micro-resonator 45 without any optical input along the guided structure. Since the output wavelength of a laser is dependent on the length of its resonator, the structure of FIGS. 3*a* and 3*b* can result in a tunable or frequency modulated laser whose optical output frequency is dependent on a given fixed or time-varying applied voltage, respectively, applied to the PZT structure 24.

Optical gain, so that the device of FIGS. 3*a* and 3*b* can function as a laser, may provided in a large number of ways, for example, by applying an excitation source that provides population inversion in the substrate and/or the ring resonator's optical guiding layer. An optical gain device may comprise a suitable medium that can achieve optical gain including, but, not limited to, semiconductor layers, including bulk, quantum well, quantum dot or quantum cascade structures; crystalline or doped amorphous dielectric materials doped with suitable atomic species such as rare-earth ions or color centers, with doping regions comprising the entire planar structure, or localized to the optical ring resonator, optical waveguide or Bragg structure; or stimulated scattering media, capable of stimulated optical gain, including, but, not limited to Raman or Brillouin scattering as well as other approaches well known in the art. Alternatively, optical gain realized through electronic or optical pumping of the structure, the former via carrier injection processes, and, the latter via optical pumping processes; the excitation source delivering the necessary excitation to achieve optical gain either via irradiation of the entire planar structure or via localized irradiation to the regions containing the optical ring resonator, waveguide or Bragg structures.

When sufficient optical gain is realized so that the ring resonator device of FIGS. 3*a* and 3*b* achieves laser oscillation, then the application of a suitable PZT control analog voltage level results in a laser with a wavelength output that is tunable over a finite optical wavelength range, and, the optical wavelength output by the laser of FIGS. 3*a* and 3*b* can be frequency modulated via the application of a suitable time-varying PZT control voltage waveform.

A chip-scale PZT-tunable ring laser 45 can be employed in many applications known per se in the prior art. For example, it can be used as an FM modulated source by modulating the PZT substrate 24. PZT-modulated ring lasers are commercially available (e.g., the "Lightwave" diode-pumped narrow-band Nd:YAG system), which can be modulated by a PZT-controlled mirror. However, these prior art devices employ discrete components that form the laser resonator, its mirrors and its tunable elements as opposed to a truly monolithic chip-scale structure as described herein. Moreover, the structures disclosed herein can enable much greater modulation rates and excursions (also with similar narrowband operation), since our diode-pumped system employs a thin film PZT to drive a very low-mass monolithic structure (i.e., the chip, which constitutes the entire laser). This follows, since the effective cavity length of this device can be fabricated to be very long (e.g., using spiral loops, similar in concept to the TTD embodiment), so that a given PZT voltage will result in a greater total laser-cavity path-length change (leading to greater tenability, etc). In addition, our chip-scale laser can be much more rugged than is the prior art discrete component laser system and, therefore, can withstand greater G-forces, given its lower mass. Such modulated sources can have application to laser communication systems (subject to the limitations of the PZT bandwidth) and Doppler-compensated systems. Moreover, by controlling the frequency excursion of a chip-scale FM oscillator (e.g., by controlling the magnitude of the voltage applied to the PZT), the device can be utilized for remote sensing via FM modulation spectroscopy, for chem-bio sensing applications, etc. This chip-scale tunable laser can also have application to onboard missile sources, coherent detectors, etc. Other novel chip-scale tunable laser structures can utilize so-called "defect" center photonic crystal lasers, which can be controlled by our PZT-based substrate or thin-film (as well as other classes of "smart materials"). Thus, a very-low threshold, tunable chip-scale laser can be realized.

Figure 9A:
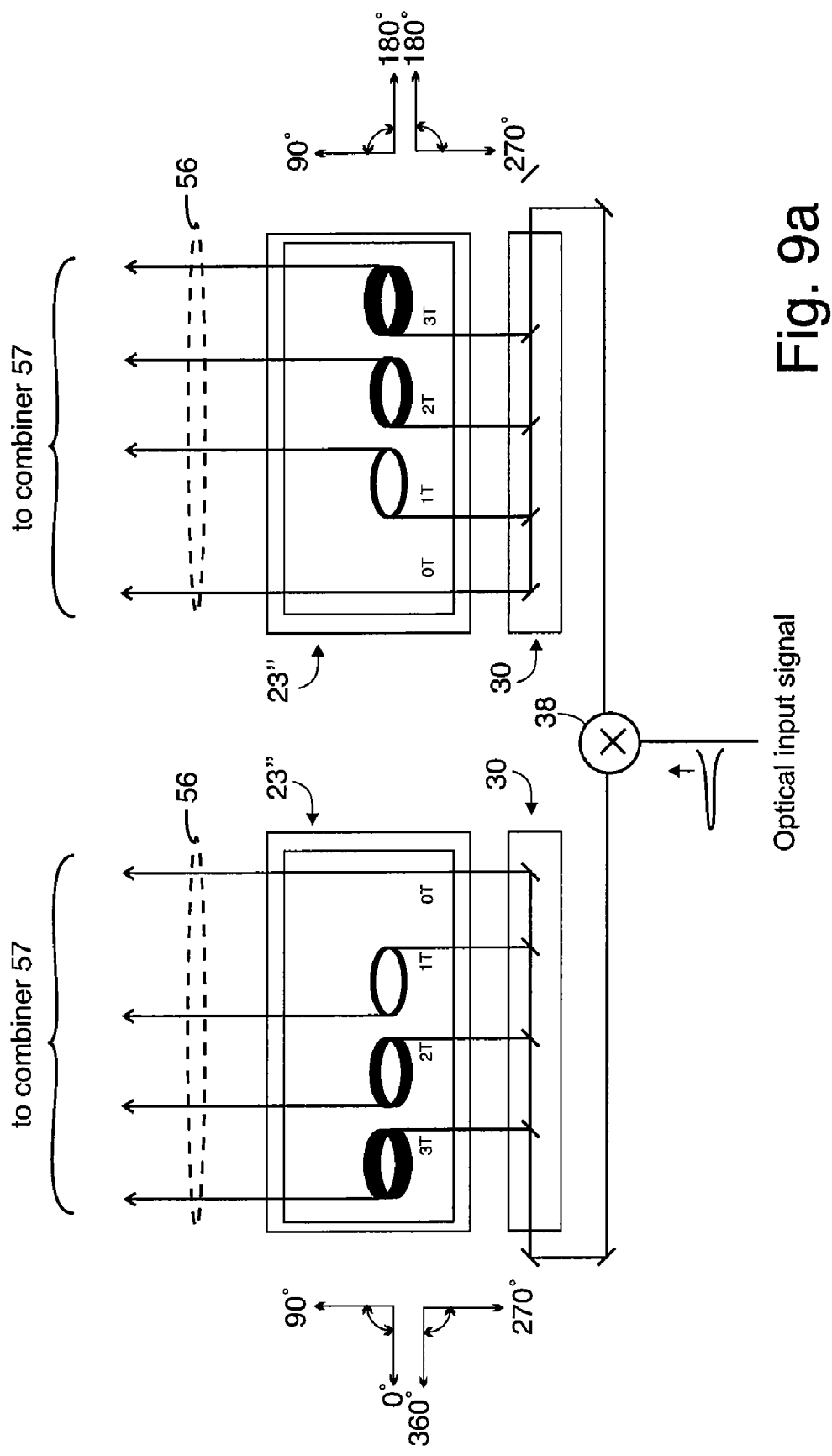

The control of the temporal delays (one control parameter $\Delta_x$ and $\Delta_y$ for each orthogonal coordinate) can be achieved using an analog control module such as that described with reference to FIGS. 1a and 1b, to control the stretch of the PZT material 24. In this embodiment, a variable voltage is applied to the delay module. This voltage determines the magnitude of the temporal delay for a given orthogonal dimension (say, the azimuth). Another analog voltage level controls the temporal delay in the orthogonal dimension (say, the elevation). In the embodiment of FIGS. 9a and 9b, the basic temporal control element consists of a planar optical waveguide device, bonded onto a substrate, using a material whose length can be controlled via an external control parameter. As the control level (say, a voltage) is increased, the physical length of the substrate can either increase of decrease. Since the guided-wave optical element is bonded to the substrate, its optical propagation time varies concomitantly, resulting in a controllable, continuously variable, temporal delay module. In one example, the planar waveguide can be fabricated using a Hydex material, whose refractive index can be made much greater in the guided region relative to the effective cladding (surrounding material). In another case, a waveguide (or, a hollow-core photonic crystal structure) can be fabricated onto a planar structure which itself can be a planar photonic crystal structure. In either case, a compact optical waveguide can be fabricated possessing the property of a tightly confined guided-wave region. This guided-wave region can be in the form of a compact delay line, configured as a folded spiral or as an optical ring resonator. As the bonded material length is varied, a guided-wave optical beam in the planar structure will acquire a different propagation delay upon transit through the structure.

The basic TTD described herein imposes time delays into each subaperture to assure time-coincidence of all optical data streams at a desired location in space. In some applications, one also desires overall wavefront coherence which guarantees that all the subapertures in the system maintain a fixed and well-defined phasefront across the entire ensemble of subapertures. In this case, the performance of the system is greatly enhanced, since the diffraction-limit of the system is determined by the overall dimensions of the composite aperture instead of by a single subaperture. Therefore, the optical brightness at the target location is increased by a factor of N×M for an N×M array of subapertures 10.

Figures 4, 5:
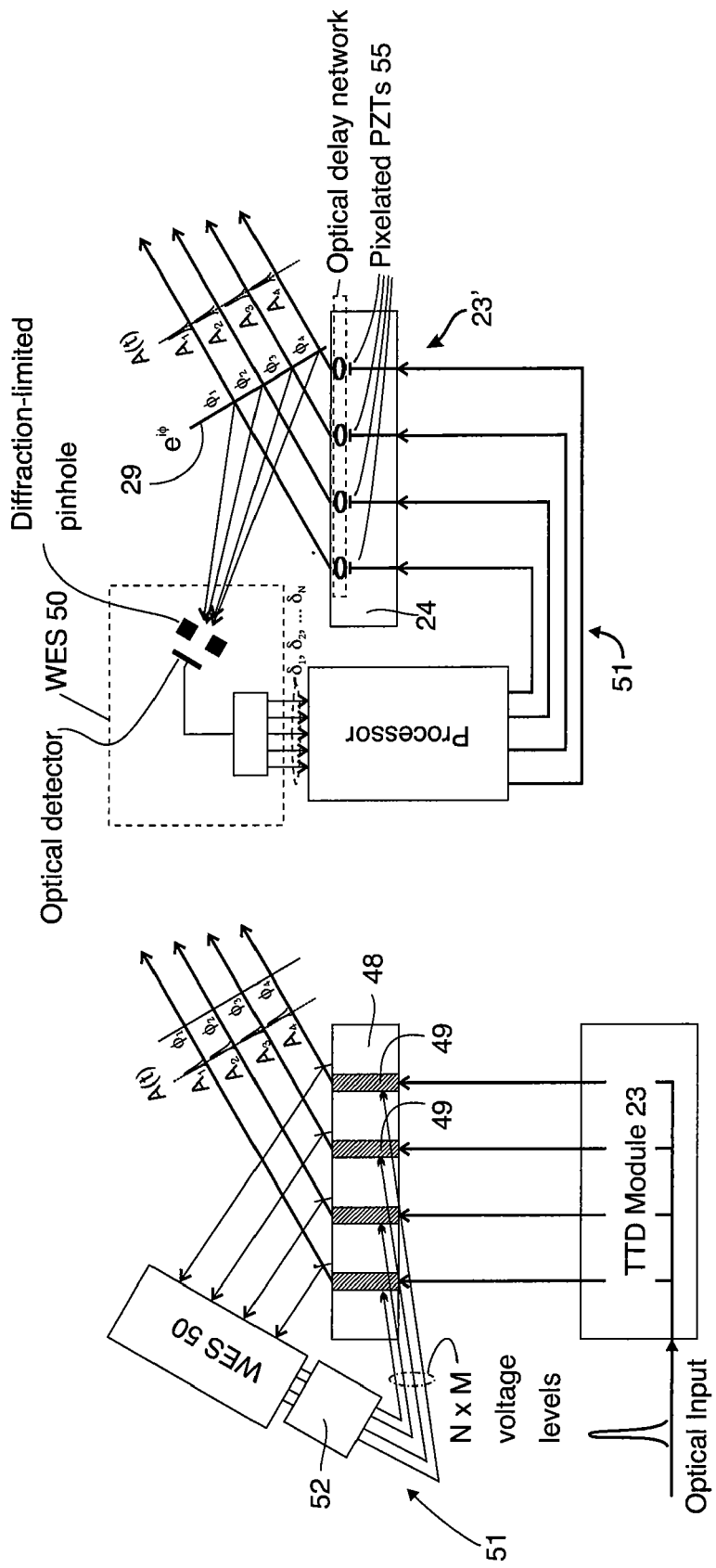
FIG. 4 depicts a system for augmenting the basic TTD modules 23 disclosed herein with an independent adaptive optical (A.O.) system, for diffraction-limited performance across the entire array.
FIG. 5 depicts an embodiment that enables the basic TTD modules 23 disclosed herein as both a TTD network as well as an optical phased array, which is necessary to impose a set of desirable optical phase shifts onto each ensemble of subapertures.

The desired optical phase control of the TTD system can be realized by augmenting the basic TTD with an adaptive optical (AO) system. A.O. systems are well known in the astronomical, communication and laser arts. In FIG. 4, a system for augmenting the basic TTD modules 23 disclosed herein with an independent A.O. system is depicted. In FIG. 5, an embodiment that enables the basic TTD modules 23 disclosed herein as both a TTD network as well as an optical phased array, which is necessary to impose a set of desirable optical phase shifts onto each subaperture 10 of the ensemble. Since an A.O. system must maintain all subaperture optical paths to within an optical wavelength of tolerance, the A.O. system has a dynamic servo-controlled approach to compensating for real-time perturbations in differential path distances (owing to thermal and mechanical perturbations, etc.).

FIG. 4 shows a system block diagram that combines a TTD module 23 (with a control parameter controlling its large scale delay—the control parameter controlling the amount of PZT stretch in the prior embodiments) and a servo-controlled A.O. system to achieve pulse coincidence at the target location (via TTD) as well as wavefront coherence, for enhanced resolution of the system (i.e., tighter focus at the target location) for enhanced optical brightness at the target location by a factor of N×M for a N×M 2-D array of subapertures 10. The A.O. system consists of a phase shifting array 48 (N×M phase shifters 49) to adjust the optical phase shift of each subaperture. It is to be noted that the phase shift is a delay, albeit, a very small scale delay compared to the parameter delay affecting the PZT stretch. The small scale delay is typically less than a wavelength while the large scale delay may well be many thousands of wavelengths.

A servo-controlled feedback loop 51 includes a Wavefront Error Sensor (WES 50) to determine the optical phase errors across the optical beam and a processor 52 to determine the set of error-control voltage levels (N×M voltage levels) to drive the optical phase shift array 48. In this embodiment, the TTD modules 23 previously described and known optical phase shifters 49 are embodied as two separate modules, 23 and 48.

FIG. 5 depicts another embodiment. Here the functions of the TTD and optical phase shifting functions are combined into a single module 23' by modifying one of the previously described TTD modules 23 to also independently adjust the optical phase shift (a relatively small scale delay) of each subaperture 10 in addition to controlling the necessary time delays using the two analog controls parameters $\Delta_y$ and $\Delta_x$ (each is a relatively large scale delay) used to control a 2-D array (N×M) of optical apertures.

In this embodiment, the PZT substrate 24 is pixelated into N×M addressable elements 55. Note that the TTD control voltage (relatively large scale control), $V_o$, is common to all (N×M) elements (or subapertures 10), consistent with the basic embodiment discussed herein, with respect to FIGS. 1 and 2, since, only a large scale control voltage is necessary to determine the necessary set of all time delays to assure coincident arrival of all pulselets to a given location in azimuth or elevation. So the control voltage corresponds to either $\Delta_x$ and $\Delta_y$ (depending on whether the associated TTD module 23 controls azimuth or elevation). Here we combine the single "global" time-delay control voltage, $V_o$, with set of N independently determined, optical phase-correction control voltages, $\delta_1, \delta_2, \ldots \delta_N$. In general, each respective pixel in the array of N pixels will have its optical phase controlled by each respective control voltage $\delta_k$ which can differ for each of the N pixels. Hence, the total voltage applied to each respective pixel, k, will be $V_{k\text{-}total} = V_o + \delta_k$. Note that, in general, $V_o \approx 10,000 \cdot (\delta_1, \delta_2, \ldots \delta_N)$, since, for a 1 cm overall aperture diameter, the required time delay (for arrival-time coincidence) is governed by the length of the aperture, which, for $\lambda = 1$ μm (a typical optical wavelength) is 10,000λ. On the other hand, the required range of phase shifts necessary to control the optical wavefront is governed by the optical wavelength, on the order of λ. The prior art describes adaptive optical (A.O.) methods that result in the control the optical wavefront of a multi-pixelated optical beam in real-time to assure phase coherence across the composite wavefront. FIG. 5 depicts a representative embodiment that combines one such A.O. technique to assure phase coherence across the resultant beam, with true-time delay control of the segmented beam to assure temporal coincidence of the arrival time of all pulselets to the target in question. Hence, a diffraction-limited beam will arrive at the target as a single temporal pulse, with enhanced optical brightness. For the example shown in FIG. 5, a "multi-dither" based A.O. control approach known per se in the prior art is utilized. A holographic beam sampler 29 is used to direct a small portion of the TTD composite output to the wavefront error sampler (WES 50) input of the servo-controlled feedback loop 51 of the A.O. system.

The control of the phase shifting of the array (for adaptive optical wavefront control) and the control of the time delay of the array for true-time delay beam steering (for high-bandwidth communication) can be achieved simultaneously. Conventional closed-loop or open-loop adaptive optical system architectures (e.g., via wavefront error sensor servo-control) can be used for wavefront control using the same module as that used for TTD control. The voltage level required for wavefront control is typically 10,000 times less than that required for true-time delay control in the case of a 1 cm overall aperture system. Thus the wavefront-control phase shifts will have a negligible effect on the performance of the TTD aspect of the device.

Given a structure with internal optical amplification (via doping of the guided-wave and/or substrate regions), a much longer waveguide can be realized, since propagation losses can be overcome. This can result in a very efficient optical phase shifter, since a relatively low applied voltage can vary the optical phase shift. Hence, a very low-voltage phase shifter can be realized that can provide phase shifts at low-voltage levels (say, TTL levels or about 5 volts) as opposed to existing PZT phase shifters that require 100s to 1000s of volts to realize similar phase shifts. This reduction in the required control voltage for phase control can result in an adaptive optical system with much greater response time and much less electrical drive power.

The planar (tightly confined) waveguide structure can be formed into a ring resonator, for use as tunable filters and optical storage, as well as slow-light propagation for optical data processing as shown in FIGS. 3a and 3b. Fixed ring resonators have been fabricated by Little Optics for fixed optical filters. However, by bonding such ring resonators onto (dimensionally) controllable substrates (i.e., controlled via applied electric fields, magnetic fields, light, temperature, etc.), tunable wavelength devices can be realized. Moreover, the incorporation of optical gain into the system—via doping of the waveguide and/or substrate and optical pumping (for example)—can result in ring resonators with extremely high Q (in the >1,000,000,000 regime) as well as ring lasers. Given that the applied voltage modifies the optical propagation path through the resonator, tunable narrow-band-pass filters can be realized, as well as tunable lasers, compact modulated lasers, and electro-optical modulators with very low required modulation voltages.

Another possible embodiment of our invention would be its use as a "programmable slow-light structure," with application to photonic processors, cache optical memories, and optical computers. Since one class of slow-optical devices involves linear optical interactions in waveguides and resonators (e.g., ring structures), embodiments of our invention can potentially lead to a chip-scale slow-light module with tunability and controllability.

Figure 6:
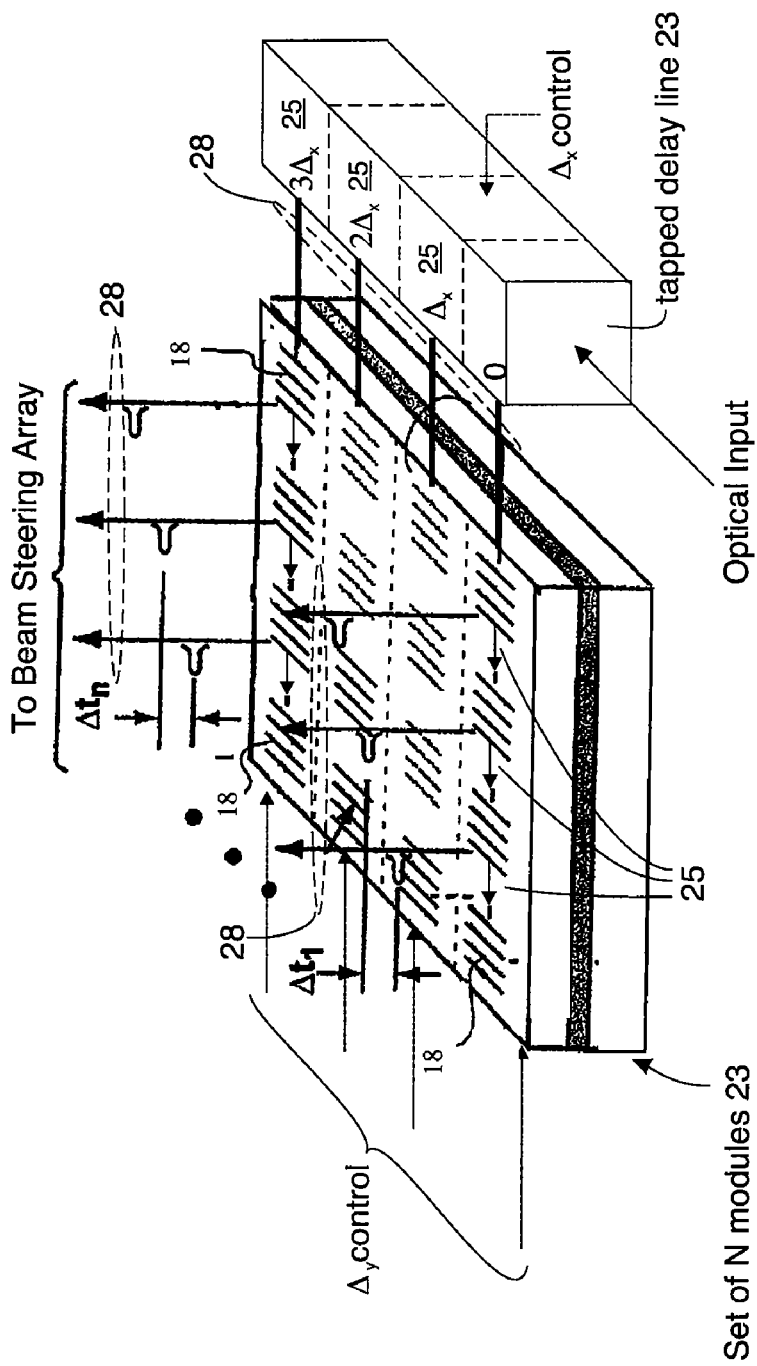
FIG. 6 shows a two dimensional arrangement of delay line modules of the types described herein forming a 2-D true time delay aperture for a communication system, for example.

FIG. 6 shows a two-dimensional arrangement of the 2-D TTD modules 23, based on the system depicted in FIGS. 1a and 1b. In this embodiment, a 2-dimensional planar waveguide structure is employed to generate a set of N×M programmable TTDs, in a parallel arrangement, and all propagating in a vertical direction to a beam-steering array module. This entire planar structure is in the form of a set of N parallel waveguide regions 23 with incremental delay lines 25 and intervening grating output couplers 18. In this embodiment, an x-tapped delay line 23 is shown on the right-hand side of the figure, with a single optical input data stream, as shown. The parameter $\Delta_x$ is applied, as an analog voltage level ($\Delta_x$), identically, to each programmable delay line 25 that forms the tapped delay line 23 responsive to the $\Delta_x$ parameter to control the PZT stretch in the tapped delay line 23. Each of the N tapped output beams 28, successively delayed by the same differential analog control voltage level $\Delta_x$, is coupled into a corresponding y-tapped delay-line module 23 in the aforementioned 2-dimensional planar waveguide structure. The $\Delta_y$ parameter is applied as a common analog control voltage level ($\Delta_y$) to all delay modules 23 making up the 2-dimensional planar waveguide structure or ensemble to control their PZT stretch. The ensemble consists of N identical y-tapped delay lines 23 all fabricated on a planar 2-dimensional waveguide structure with the PZT material as previously described. Each of the N y-tapped delay lines 23 consists of a set of programmable incremental delay elements 25, of which there are M such tapped outputs along a given y-tapped delay line. The composite waveguide structure thus consists of an array of N×M total tapped and delayed output beams 28, which are preferably directed in a vertical direction, emanating out from the major plane of the structure, and directed to a beam steering array. It should be noted that, in general, the parameters $\Delta_x$ and $\Delta_y$ and the corresponding analog voltage levels are independent of one another and can be of different values since $\Delta_x$ and $\Delta_y$ are preferably used to assure the simultaneity of a set of pulselets for a specific azimuth direction and elevation, respectively.

In this embodiment, the guided beam along each y-tapped delay line in the 2-D ensemble encounters a set of grating output couplers 18, each with a progressively increasing fractional output ratio, and a corresponding decreasing fractional transmitted ratio as the latter beam continues to propagate along the remainder of the given y-tapped delay line. That is, the set of gratings along a given y-tapped delay line 23 may be configured such that the diffraction efficiency of the gratings 18 increases from the input end of the line of gratings to the terminus end. The stream of incident optical pulses from the x-tapped delay line is coupled to a TTD region of the waveguiding structure associated with a line of output gratings. The gratings 18 are configured so that all out-coupled beams 28 emerge normal to the planar structure, in a vertical direction, with the optical power approximately identical for each of the N×M outputs.

Optional fixed delay elements (labeled as $12_{FXO}$ and $20_{FO}$ in FIG. 5 of the related US Patent Application) are not shown in FIG. 6 for ease of viewing, but, in general, are positioned along interconnecting beams 28 that couple the $\Delta_x$ controlled TTD module 23 to the 2-D array of $\Delta_y$ controlled TTD modules 23, and, additionally, along each of the N×M output beams that emerge orthogonally from the 2-D planar waveguide structure (unless their need is obviated by using embodiment of FIGS. 9a and 9b described hereinafter). Also not shown are optional optical amplifiers (see numeral 27 in FIG. 1a). These optional amplifiers can be incorporated along each of the N×M output beams as in FIG. 1a, for example, or, can be integrated into the 2-D N×M planar waveguide structure of $\Delta_x$ controlled time delay modules 23 and gratings 18. In the latter case, optical amplification can be integrated into the substrate, guiding layers and/or the waveguide channels of the 2-D N×M grating/waveguide structure. Myriad optical amplification techniques can be employed such as optically pumped rare-earth doped waveguide materials, as well as electrically pumped semiconductor-based waveguide materials. In the case of hybrid TTD and amplification, the fractional beam-coupling ratios of the grating couplers need to be modified so that each of the N×M amplifier section achieves gain saturation, at least for temporally encoded pulse-formatted data streams.

In FIG. 6, note that the input beam from the modulated source is incident to the TTD system from the right-hand guided region of the $\Delta_x$ controlled TTD module 23, whereas the ensemble of time-delayed output beams emerge from the top surface of the planar waveguide $\Delta_y$ controlled TTD modules 23, which are subsequently directed to the beam steering module. Prisms, gratings, or other means known in the art may provide for coupling of the $\Delta_x$ controlled TTD N-output beams into the 2-D array of $\Delta_y$ controlled TTD modules 23, as well as the $\Delta_x$ controlled TTD N×M output beams. This TTD modular configuration is amenable to a stacked three-dimensional optical interconnection architecture for the entire system.

Use of Fixed and Variable Delays in the Disclosed Structures

Note that, in general, a set of fixed delays and a set of adjustable delays is always required for a tapped TTD system as disclosed herein and as disclosed in the related U.S. patent application Ser. No. 12/025,647 mentioned above. And, in addition, the delay module must also provide a capability to incorporate set of different temporal delays across the module to account for the propagation time through the module itself. This follows, given the need to generate an effective "negative" delay to the tap nearest to the input data stream, and, decreasing along the subsequent taps. See the Appendix below for a discussion of these requirements in more detail.

All the embodiments therefore accomplish the same desired result. They differ in how and where the two sets of delays (fixed and variable) are built into the system, and, how and where the set of fixed offset delays are incorporated into the device.

Incorporating Fixed Delays into the Variable Delay Structures

In essence, the embodiment that follows incorporates the required fixed delays into the variable delay module itself. As we show below, this embodiment requires a set of delays, each of which has a different overall delay, which can also be controlled. This is opposed to the embodiment disclosed in U.S. patent application Ser. No. 12/025,647 mentioned above, wherein the same adjustable delay is replicated into each successive tap location along the delay structure with the overall accumulated delay increasing at each successive output tap. Since the variable delays are identical, the embodiment disclosed in U.S. patent application Ser. No. 12/025,647 mentioned above also requires a stand-alone matrix of different fixed delays. Again, both embodiments (the embodiment disclosed in U.S. patent application Ser. No. 12/025,647 mentioned above and that described below) perform the same overall function, but the new approach in essence, incorporates everything into one delay structure.

Without loss of generality, let us assume a single, one-dimensional tapped delay-line. Hence, we confine ourselves to a FOV coverage on a single 2-D plane (azimuth). The extension to a 3-D system—where one can also propagate out of the plane, i.e. upwards (elevation), easily follows.

Given this introduction, let us now proceed: Instead of setting up the device to always add successively more delay to each tapped output relative to the first tapped exit, one can build a delay line with no adjustable delay between the taps (other than the time it takes the light to travel straight through the structure). In this new case, therefore, as the light exits the given tap, it enters an adjustable, yet, different temporal tap which is dedicated only to that tap. In this way, one can make this independent adjustable delay to have the correct delay to enable the light exiting the first tap to be always greater in delay relative to each subsequent tap. So, in the case of a delay line with four taps, the first tap would direct the light into a variable delay that is four times greater the delay line attached to the last tap. This can be done by making the first delay line longer than the second, and, so on. Another way to picture all this is to imagine that the fixed delay offset is now adjustable. That is, take out the existing "variable delay structure" (with successively increasing controllable delays along the delay lines—conceptually similar to the structure shown in FIG. 1 herein) in the FIG. 5 of U.S. patent application Ser. No. 12/025,647, and replace it with a fixed, passive tapped waveguide that simply takes a single input beam, with taps along it, into all the (independent) variable delays lines above it. See FIG. 7 herein. So, the first tap would vary from zero delay to 4T (instead of a fixed offset of 4T); the second tap would be adjustable from zero delay to 3T (instead of a fixed offset of 3T), etc. It follows that a single voltage can control this, since the length of the first delay line is four times longer than the last, so for a given voltage, it will add four times the relative delay than the last delay line, and, so on.

Figure 7:
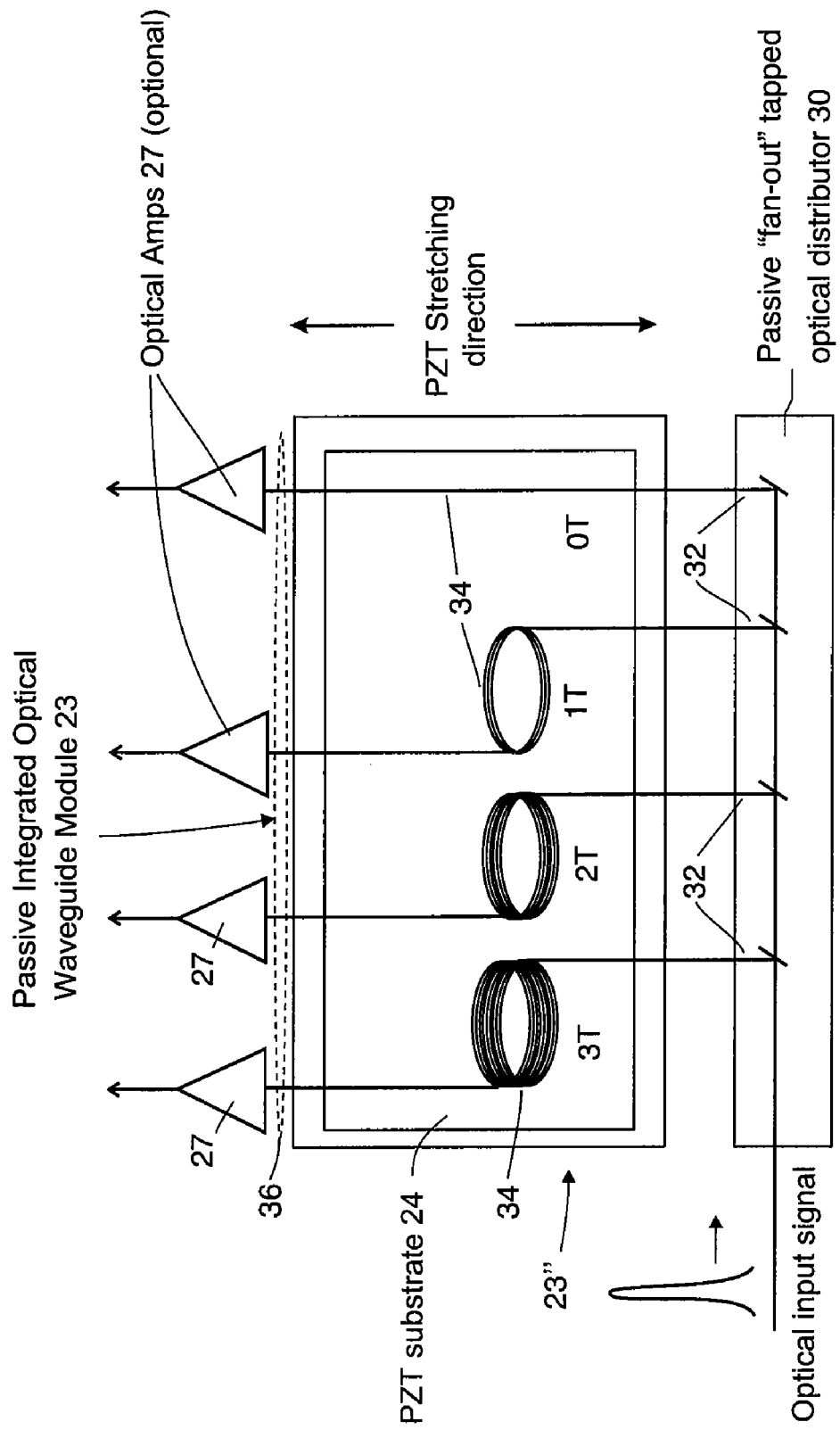
FIG. 7 depicts a module with fixed delays.

Referring to FIG. 7, the input signal enters a tapped distribution line 30, having no external matrix of fixed delays (i.e., a "passive" tapped line)—other than the inherent propagation delay(s) within it.

In this embodiment, there are four output taps 32, which, in FIG. 7, exit in a vertical direction. The number of taps can be varied as needed.

Each output tap 32 then enters a variable "multi-delay-line" module 23". See FIG. 7—the upper element 23" has multiple optical spirals connoting intentional delays (the right most delay line 34 has zero spirals). Each input tap of module 23" has its own, independent delay line 34. A set of outputs 36 exits and enters a set of (optional) optical amplifiers 27. The left-hand-most delay in this module is equal to 3T, and, each subsequent delay line diminishes in its delay, ranging from 2T, 1T, to 0T. The 0T delay line preferably has a little delay as reasonably possible (ideally it would have zero delay, but that just is not physically possible).

The value of T is chosen so that the delay of the left hand delay line (3T in this embodiment) is equal for the time it takes light to propagate across the input (passive), tapped line 30, from the left-hand-most side to the right-hand-most side. Hence, without any control voltage (i.e., V=0), the left-hand-most output is delayed so that, when the right-hand-most signal exits the module, the signals will all exit the module at the same time. This condition corresponds to a situation where one desires to direct all these beams upward as well as downward, which we refer to as 90° and 270°, respectively, as shown in FIG. 8a.

Figure 8A:
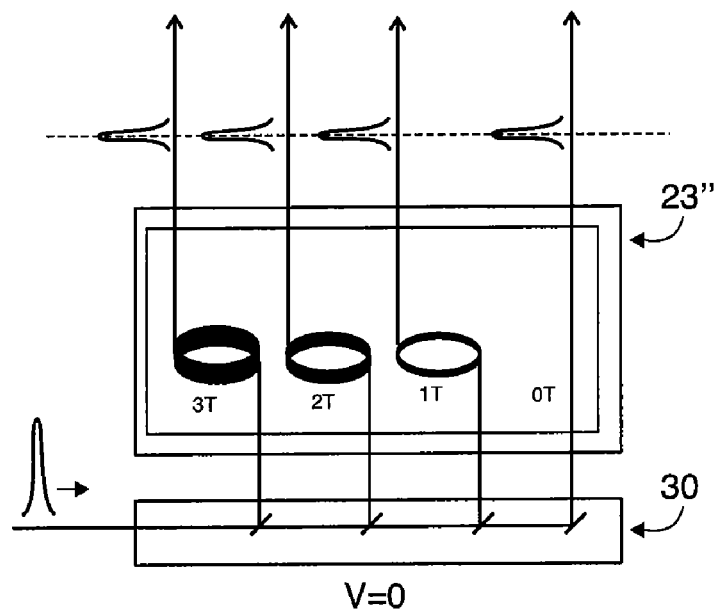
FIGS. 8a and 8b depict the effect of varying the control voltage applied to the module with fixed delays of FIG. 7.
Figure 8B:
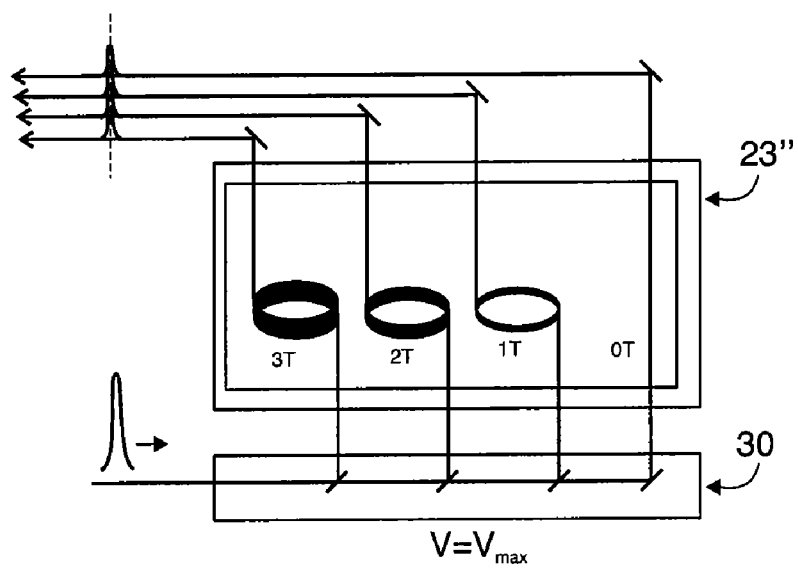

Now, referring to FIGS. 8a and 8b, we assume that a voltage V is applied to the PZT substrate 24 of module 23" thereby affecting all the delay lines 34. In FIG. 8a the voltage V is zero while in FIG. 8b the voltage is $V_{max}$. Therefore, in FIG. 8a, the pulses are coincident in the vertical direction) (90°) whereas as voltage, V, is increased, the spirals 34 stretch so that the delay time is increased through each spiral of each delay line 34. The 0T delay line is hardly affected by the change in size of the PZT substrate 24 since it has no intentional delay spiral therein. The total delay in each spiral of each delay line 34 is equal to the initial value (3T, 2T, 1T, 0)+a voltage-dependent increment, $\Delta T(V)$. Since the total length of each spiral is decreased by T as we go from left to right in the figure, the voltage-dependent incremental increase in the respective delays differs by the same amount accordingly, from $3T+3\times\Delta T(V)$, to $2T+2\times\Delta T(V)$, to $T+\Delta T(V)$, to zero relative delay.

We choose the maximum voltage dependent change in delay, $\Delta T(V_{ma}x)$, to equal T (i.e., at $V_{max}$, $\Delta T=T$). Therefore, at $V_{max}$, the total delay of the FIRST delay line (on the left hand side of the module 23" in FIG. 8b) is equal to the "round-trip" time; that is, the time it takes for light to travel across the module (from left to right) and back (from right to left), that is 2×3T. At $V_{max}$, therefore, all the tapped optical beams would exit the module simultaneously if all the tapped beams were reflected back on themselves, with all the beams exiting on the left side of the device, and, propagating towards the left. Hence, this condition corresponds to a situation where one desires to direct all these beams traveling in the left direction, which we refer to as 0°, as shown in FIG. 8b.

Figure 8C:
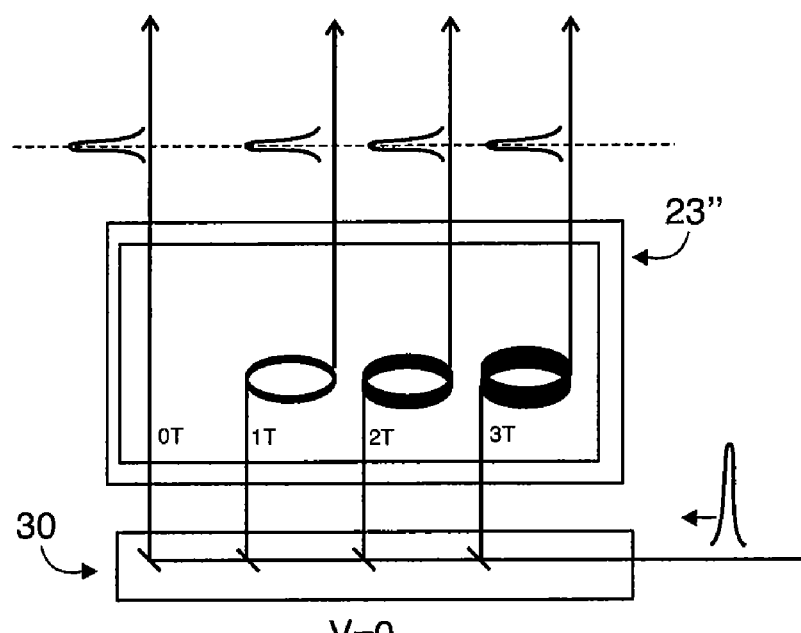
FIG. 8c shows the effect of a similar module, but flipped 180° about a vertical axis (in the plane of the figure). The pair of modules (of e.g.

FIG. 8c shows the same TTD module, flipped by 180° about a vertical axis in the plane of the figure. This orientation therefore provides for pulse coincidence ranging from upwards or downwards (90°, 270°) at V=0 to propagation to the right) (180°) at $V=V_{max}$. This pair of modules shown in FIGS. 8a and 8c, therefore provides for TTD's capable of pulse simultaneity in the entire plane of the figure (the half-space) or the complete azimuthal range (0° to 360°).

Hence, since the range of output angles where simultaneity of the multiple beams can be achieved for a single TTD module is equivalent to two quadrants within a 2-dimensional planar field-of-view. FIG. 9a shows how one can arrange two such TTD (single-quadrant) modules 23" into a configuration so that the entire half-space can be addressed to realize simultaneous beam arrival to a given location in the plane. Here, we have two dual-quadrant modules 23", with only one of them utilized at a time. The selection of the specific module is chosen, depending on the given range of output angles one desires, by an optical switch 38. In FIG. 9a, a conventional photonics 1×2 switching component 38 is utilized, whose input is the initial data stream, and, whereby each of its two (switchable) outputs is coupled into one of the pair of modules 23", as shown. A control signal is applied to the switch to control which of the pair of possible dual-quadrants shown in the figure is to be active.

The outputs 56 from the two modules 23" are applied to a optical combiner (or switch) 57 as shown in FIG. 9b. The combiner 57 channels the outputs 56 of each module 23" onto corresponding inputs 59 to a two-dimensional array 131 formed by a plurality of modules 23. The array 131 is basically identical to the array 131 shown in FIG. 6 and as in the case of FIG. 6, array 131 is controlled by one of the two control parameters (Δy). The other control parameter Δx controls the PZT stretch of modules 23" while control parameter Δy controls the PZT stretch of modules 23 forming array 131. The modules 23 in the array may be formed according to any of the embodiments of the modules disclosed herein and indeed the modules 23 in array 131 may be placed on a common PZT substrate since each of them respond to the same PZT-stretch controlling parameter.

If a set of optical amplifiers, such as amplifiers 27 shown in FIG. 1 or 7 is desired, one can also selectively switch the amplifier pumping source to only activate the amplifiers for the desired quadrant in operation.

In principle, one can simultaneously direct TTD beams into multiple direction by duplicating the basic structure of FIGS. 9a and 9b, addressing both such systems in parallel, and so on.

Bottom line: The tradeoff is, in the embodiment of U.S. patent application Ser. No. 12/025,647, a set of equal delays between the taps is varied, so that the delays accumulate along the delay structure. In this new embodiment of FIGS. 7-9b, each tap from a passive, tapped structure, is directed into an ensemble of variable delays lines, with each independent delay line increasing in delay (or, length). In each embodiment, a first control voltage is required to move a output beam through 360° in azimuth and second control voltage is required to move a output beam between 0 and 90° in elevation.

APPENDIX

Discussion on the Need for a Fixed Delay in any General Tapped TTD System

In general, an effective "negative" time delay is needed to enable a TTD to provide the necessary time delays for a beam-steered direction greater than 0 degrees. That is, the light exiting the first "tap" after entering the input end of the tapped TTD must be delayed relative to light reaching any subsequent taps to provide the required delays. As an example, imagine that one desires to direct the output light normal to the structure (which would be the extreme angle in the first quadrant). This means that the light exiting the first tap needs to be "sequestered" long enough for the light to reach the other end of the delay line. This will assure one that all the light will emerge normal to the line at the same time. Using this reasoning, one sees that the first tap will ALWAYS need to have more delay than the other subsequent taps, since it needs to "wait" until the light reaches the any of the other taps, exits the TTD, and is then directed to reflect into any angle greater than zero degrees. Since the device, as designed, always ADDS more delay as the beam travels down the structure, the only way to "hold" the first light is to find a way to delay the first light relative to the other taps.

CONCLUDING COMMENTS

Having described this invention in connection with several embodiments and applications of same, further embodiments and/or applications will doubtlessly suggest themselves to those skilled in the art. As such the invention is not to be limited to the disclosed embodiments or to the disclosed applications for using same unless specifically required by the appended claims.

The invention claimed is:

1. An optical time delay module comprising:
   a. a substrate of a smart material that changes dimension in response to an analog electrical control signal;
   b. a plurality of optical time delay elements connected in series in an optical circuit disposed on said substrate, an initial time delay element in said series being responsive to an optical input to said module;
   c. a plurality an optical output couplers wherein each of said optical output couplers is operationally connected between each time delay element in said series, the optical output couplers providing a plurality of tapped optical outputs from said module with different optical delays controlled by said analog electrical control signal;
   d. wherein each time delay element is arranged on or in said substrate of said smart material to change an amount of time delay imposed thereby in response said substrate changing dimension in response to changes in said analog electrical control signal.

2. An optical time delay module according to claim 1 further including another optical output coupler connected upstream of initial said time delay element in said series, the another optical output coupler providing an additional optical output from said module which is not affected by said analog electrical control signal.

3. The optical time delay module of claim 1 wherein each time delay element is formed by a optical fiber spiral.

4. The optical time delay module of claim 1 wherein each time delay element is embodied in a chip-scale structure fabricated using thin-film deposition techniques, whereby an optical waveguide structure or photonic crystal structure is grown onto said smart material, the waveguide structure or photonic crystal structure forming said time delay elements.

5. The optical time delay module of claim 1 wherein each optical output coupler comprises a "2-k" Bragg grating whereby each tapped optical output of said module emerges normal to a major surface of said substrate.

6. The optical time delay module of claim 1 wherein an optical input coupler comprises a "2-k" Bragg grating whereby the optical input to said module arrives normal to said major surface of said substrate.

7. The optical time delay module of claim 1 wherein each time delay element is embodied by a micro-ring resonator.

8. The optical time delay module of claim 1 further including (i) an associated phase shifting array coupled to receive light form the optical time delay module and (ii) a wave error sensor in a servo controlled feedback loop for adjusting phases errors occurring in optical signals appearing at the outputs of the time delay module.

9. The optical time delay module of claim 1 further including an integral phase shifting means for correcting phase shifts which might occur in optical signals output by the optical time delay module.

10. An optical time delay module according to claim 1 in combination with an array of a plurality of optical time delay modules each according to claim 1, outputs of the first mentioned time delay module providing inputs to said array of time delay modules.

11. An array of a plurality of optical time delay modules according to claim 1 in combination with at least another time delay module comprising:
 a. a substrate of a smart material that changes dimension in response to an analog electrical control signal;
 b. a plurality of optical time delay elements arranged in parallel an optical circuit disposed on said substrate, an initial time delay element of said plurality imposing essentially zero delay and each successive optical time delay element imposing a time delay equal to 1T, 2T, 3T, . . . , one end of each time delay element providing an output of said module; and
 c. an optical splitter having a plurality of output and an input responsive to an optical input to said module, said optical splitter having a maximum time delay equal to T;
 d. the optical outputs from said module having different optical delays controlled by said analog electrical control signal;
 e. wherein delay element is arranged on or in said substrate of a smart material to change an amount of time delay imposed thereby in response said substrate changing dimension in response to changes in said analog electrical control signal wherein the output of the at least another time delay module are applied to input of the array of time delay modules.

12. An optical time delay circuit comprising a plurality of optical time delay modules as recited by claim 1, the optical inputs of the plurality of time delay modules being coupled to an optical switch.

13. The optical time delay module of claim 1 in combination with an array of a plurality of optical time delay modules each comprising:
 a. a substrate of a smart material that changes dimension in response to an analog electrical control signal;
 b. a plurality of optical time delay elements connected in a series in an optical circuit disposed on said substrate, an initial time delay element in said series being responsive to an optical input to said module;
 c. a plurality an optical output couplers wherein each of said optical output couplers is operationally connected between each time delay element in said series, the optical output couplers providing a plurality of tapped optical outputs from said module with different optical delays controlled by said analog electrical control signal;
 d. wherein each time delay element is arranged on or in said substrate of said smart material to change an amount of time delay imposed thereby in response said substrate changing dimension in response to changes in said analog electrical control signal;
 wherein outputs of the first mentioned time delay module providing inputs to said array of time delay modules.

14. The optical time delay module of claim 1 wherein said smart material that changes dimension in response to an analog electrical control signal is a piezoelectric material.

* * * * *

UNITED STATES PATENT AND TRADEMARK OFFICE
CERTIFICATE OF CORRECTION

| | | |
|---|---|---|
| PATENT NO. | : 7,729,572 B1 | Page 1 of 1 |
| APPLICATION NO. | : 12/169174 | |
| DATED | : June 1, 2010 | |
| INVENTOR(S) | : David Pepper et al. | |

It is certified that error appears in the above-identified patent and that said Letters Patent is hereby corrected as shown below:

In the Specification, Col. 1, line 5, please insert the following paragraph:

--STATEMENT REGARDING FEDERALLY SPONSORED RESEARCH OR DEVELOPMENT

The present invention was made with support from the United States Government under Contract No. DAAB07-01-C-K802, CECOM. The U.S. Government has certain rights in the invention.--

Signed and Sealed this
Twenty-fifth Day of January, 2011

David J. Kappos
*Director of the United States Patent and Trademark Office*